(12) United States Patent
Shiraishi (10) Patent No.: US 7,757,715 B2
(45) Date of Patent: Jul. 20, 2010

(54) ACCUMULATOR AND METHOD OF MANUFACTURING FLOW DAMPER

(75) Inventor: Tadashi Shiraishi, Takasago (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 672 days.

(21) Appl. No.: 11/564,034

(22) Filed: Nov. 28, 2006

(65) Prior Publication Data
US 2008/0121299 A1 May 29, 2008

(51) Int. Cl.
F15C 1/16 (2006.01)
(52) U.S. Cl. ...................................... 137/813
(58) Field of Classification Search .............. 137/808, 137/812, 813; 376/282, 299
See application file for complete search history.

(56) References Cited

U.S. PATENT DOCUMENTS

| | | | | |
|---|---|---|---|---|
| 3,324,891 | A | * | 6/1967 | Rhoades ............... 137/812 |
| 3,722,522 | A | * | 3/1973 | Randall ............... 137/812 |
| 4,666,654 | A | | 5/1987 | Forsberg |
| 5,309,488 | A | | 5/1994 | Matsuoka |
| 5,414,743 | A | | 5/1995 | Batheja et al. |

FOREIGN PATENT DOCUMENTS

| | | |
|---|---|---|
| EP | 0362596 A1 | 4/1990 |
| JP | 63-19597 A | 1/1988 |
| JP | 04-328494 A | 11/1992 |
| JP | 05-256982 A | 10/1993 |
| JP | 08-285974 A | 11/1996 |
| WO | WO 93/04481 A1 | 3/1993 |

OTHER PUBLICATIONS

T. Ichimura et al., "Advanced Accumulator for PWR", Denryoku Kyodo Kenkyu vol. 48, No. 5, May 1997, pp. 35-42.
Taiki Ichimura et al., "Design Verification of the Advanced Accumulator for the APWR in Japan", 8th International Conference on Nuclear Engineering, Apr. 2-6, 2000, pp. 1-9.
I.C. Chu et al., "Performance Evaluation of Passive Safety Injection Flow Controllers for the APR1400 Reactor", 10th International Conference on Nuclear Engineering, Apr. 14-18, 2002, pp.1-7.
Han-Gon Kim et al., "The Design Verification of the Advanced Design Features in APR1400", 13th International Conference on Nuclear Engineering, May 16-20, 2005, pp. 1-4.
International Search Report of PCT/JP2007/072066, dated Feb. 12, 2008.

* cited by examiner

*Primary Examiner*—John Rivell
*Assistant Examiner*—Craig M Schneider
(74) *Attorney, Agent, or Firm*—Westerman, Hattori, Daniels & Adrian, LLP (57) ABSTRACT

An accumulator provided with a flow damper inside, the flow damper including a cylindrical vortex chamber, a small flow pipe connected to a peripheral portion of the vortex chamber along a tangential direction thereto, a large flow pipe connected to the peripheral portion while forming a predetermined angle with the small flow pipe, and an outlet pipe connected to an outlet formed at a central part of the vortex chamber, in which a first junction of the large flow pipe and the vortex chamber of the flow damper is located outside an extension line of an inner surface, at the side of the large flow pipe, of the small flow pipe.

3 Claims, 5 Drawing Sheets

ACCUMULATOR AND METHOD OF MANUFACTURING FLOW DAMPER

BACKGROUND OF THE INVENTION

1. Field of the Invention

The present invention relates to an accumulator incorporating a flow damper which is capable of statically switching flow rates from large to small, and to a method of manufacturing the flow damper. The present invention is useful when applied to an emergency injection system for a reactor in a pressurized water reactor (PWR) power plant, for example.

2. Description of the Related Art

An emergency core cooling system is installed in the PWR power plant. The emergency core cooling system includes an accumulator and so forth on the assumption that the PWR might cause a loss of primary coolant accident.

Water (coolant) is stored in the accumulator, and the water stored therein is pressurized by a pressurizing gas (nitrogen gas) which is filled in an upper part in the accumulator. Moreover, a flow damper is provided in the accumulator. The flow damper can switch a water injection flow rate in a reactor from a large flow to a small flow statically (without moving any part thereof). The flow damper includes a vortex chamber, a large flow pipe, a small flow pipe, an outlet pipe and the like, and is disposed at the bottom in the accumulator (see FIG. 1). A tip end of the outlet pipe is connected to a low temperature pipeline of a reactor primary coolant loop with a check valve interposed in between. The check valve is used for avoiding a back flow from a rector primary cooling system to the accumulator.

If the pipeline or the like in the reactor primary cooling system of the PWR power plant is broken and the coolant flows out of a crack to the outside (i.e. upon occurrence of a loss of primary coolant accident), the amount of the coolant in a reactor vessel may be reduced, and thereby a reactor core may become exposed. In this situation, however, if a pressure of the primary cooling system drops below a pressure in the accumulator, the water stored in the accumulator is injected from the primary cooling system pipeline into the reactor vessel through the check valve, and thereby refloods the reactor core.

In this case, the reactor vessel is refilled quickly by injecting water at a large flow rate at an initial stage thereof. Then, it is necessary to switch the water injection flow rate from the large flow to a small flow at a later stage when the reactor core is reflooded, because excessively injected water may spill out of the crack. In order to ensure this water injection flow rate switching operation, a reliable flow damper without a moving part is used for the accumulator.

The principles of the water injection flow rate switching by use of such a flow damper will be explained on the basis of FIGS. 8A to 8C (horizontal sectional views).

Figures 8A, 8B, 8C:
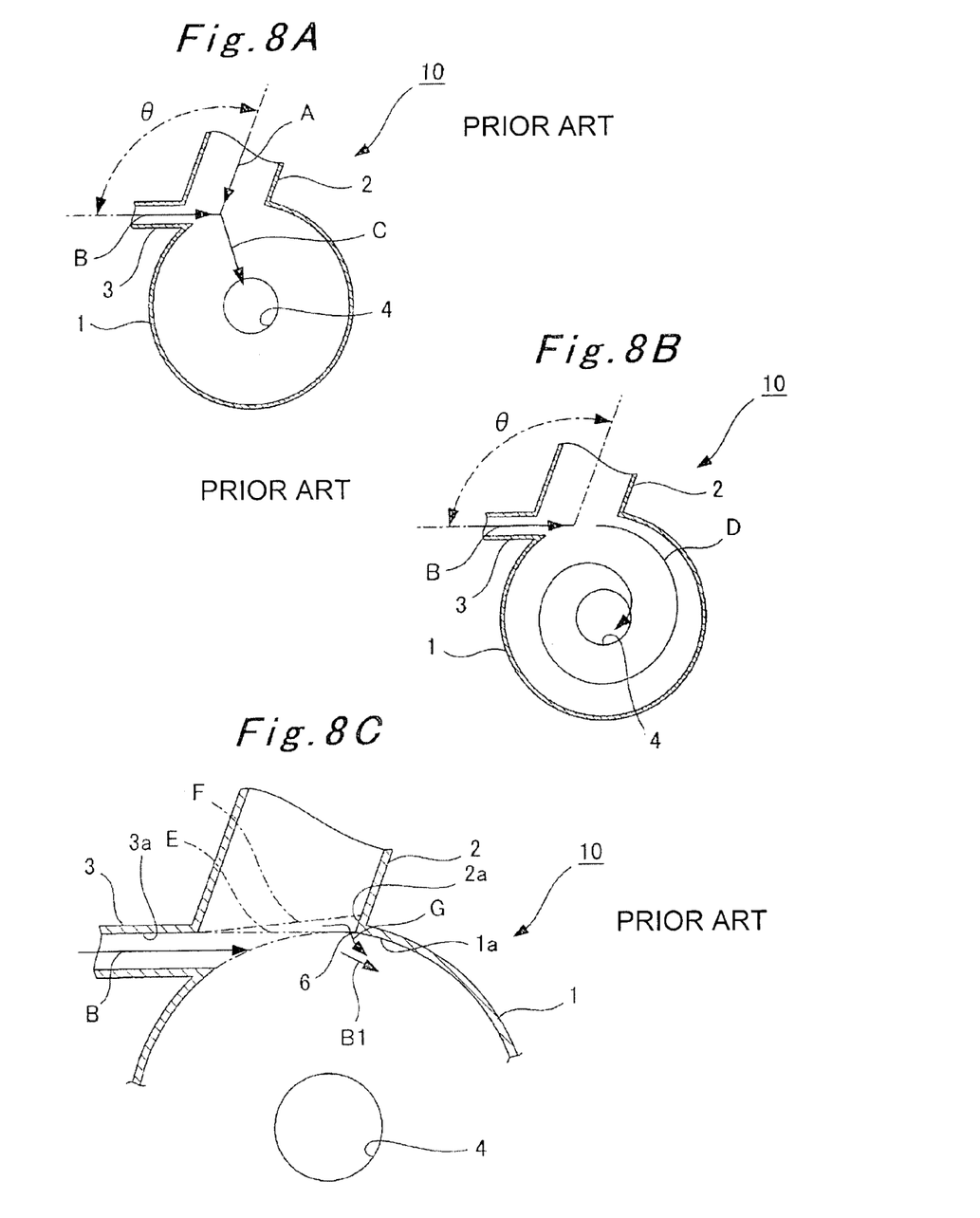
FIGS. 8A to 8C are views for explaining water injection flow switching by use of a conventional flow damper.

As shown in FIGS. 8A to 8C, a flow damper 10 has a structure in which a large flow pipe 2 and a small flow pipe 3 are connected to a peripheral portion (a circumferential portion) of a cylindrical vortex chamber 1, while an outlet 4 is formed in the center of the vortex chamber 1. The large flow pipe 2 and the small flow pipe 3 extend in mutually different directions from the outlet 4. Specifically, the small flow pipe 3 extends in the left direction along a tangential direction to the peripheral portion (the circumferential portion) of the vortex chamber 1. Meanwhile, the large flow pipe 2 extends in the right direction while forming a predetermined angle θ with the small flow pipe 3. Moreover, although illustration is omitted, an inlet of the small flow pipe 3 is located at the same level as the vortex chamber 1. Meanwhile, the large flow pipe 2 is connected to a standpipe which extends upward. An inlet of this standpipe is located higher than the vortex chamber 1 and the inlet of the small flow pipe 3. Furthermore, an outlet pipe is connected to the outlet 4 of the vortex chamber 1.

Moreover, since the water level in the accumulator is higher than the inlet of the large flow pipe 2 at the initial stage of water injection, the water in the accumulator flows into the vortex chamber 1 from both of the large flow pipe 2 and the small flow pipe 3 as indicated with arrows A and B in FIG. 8A. As a result, the injected water (a jet) from the large flow pipe 2 collides with the injected water (a jet) from the small flow pipe 3, and angular momenta of the jets are offset. In this way, the water flows directly toward the outlet 4 as indicated with an arrow C in FIG. 8A. Specifically, no vortex is formed in the vortex chamber at this time. Accordingly, a flow resistance is reduced at this time, and thus a large amount of water flows out of the outlet 4 and is injected into the reactor vessel.

By contrast, at the later stage of water injection, the water level in the accumulator drops below the inlet of the standpipe connected to the large flow pipe 2. Accordingly, there is no water flow from the large flow pipe 2 into the vortex chamber 1, and the water flows into the vortex chamber 1 only through the small flow pipe 3 as indicated with an arrow B in FIG. 8B. As a result, the injected water from this small flow pipe 3 proceeds to the outlet 4 while forming a vortex (a swirling flow) as indicated with an arrow D in FIG. 8B. Accordingly, the flow resistance is increased by the centrifugal force at this time, and an outflow (the water injected to the reactor vessel) from the outlet 4 becomes a small flow. This device is called a flow damper because it has the function to damp the flow rate as described above.

As described above, the accumulator currently in development is the advanced accumulator which is capable of switching flows from large to small statically and securely by including the flow damper 10. Moreover, the flow damper 10 of this advanced accumulator is required to define a proportion between the large flow and the small flow as high as possible in order to achieve a reasonable tank volume. For this reason, it is essential not to form a vortex in the vortex chamber by surely offsetting the angular momenta between the jet from the large flow pipe 2 and the jet from the small flow pipe 3 at the time of the large flow injection. Meanwhile, it is necessary to generate a high flow resistance by forming a strong vortex in the vortex chamber 1 when switching from the large flow to the small flow.

Accordingly, at the time of the small flow injection, the strong vortex is formed in the vortex chamber 1 by connecting the small flow pipe 3 along the tangential direction to the peripheral portion (the circumferential portion) of the vortex chamber 1.

However, as shown in FIG. 8C, the water flow (a free jet) blown out of the small flow pipe 3 into the vortex chamber 1 not only includes a direct flow along the tangential direction (see a dashed line E) but also includes a flow which spreads out of the extension line E of an inner surface 3a, at the side of the large flow pipe 2, of the small flow pipe 3 as indicated with a dashed line F (a proportion of spread caused by this free flow is approximately equal to 1/10). By contrast, in a conventional structure of a wall facing the small flow pipe, a junction 6 of the large flow pipe 2 (an inner surface 2a) and the vortex chamber 1 (an inner surface 1a) is located either on the extension line E or inside the extension line E. For this reason, part of the jet from the small flow pipe 3 (free-jet-spreading portion) collides with the inner surface 2a of the large flow pipe 2 as indicated with an arrow G, and flows into the vortex chamber 2 while bypassing the junction 6 of the large flow pipe 2 and the vortex chamber 1.

As a result, the part of the jet is detached from the inner surface 1a of the vortex chamber 1, and flows in an inclined flow direction toward the center of the vortex chamber 1 as compared to the aforementioned tangential direction. Due to an influence of this flow, the overall flow direction of the jet from the small flow pipe 3 is inclined toward the center of the vortex chamber 1 as compared to the tangential direction (as indicated with an arrow B1). Accordingly, the vortex formed in the vortex chamber 1 is weakened by reduction of the angular momentum of the jet.

SUMMARY OF THE INVENTION

In view of the above-described circumstance, an object of the present invention is to provide an accumulator including a flow damper, which is capable of forming a strong vortex in a vortex chamber at the time of a small flow injection and thereby obtaining a high flow resistance.

To attain the object, an accumulator according to a first aspect of the present invention is an accumulator provided with a flow damper inside, the flow damper including a cylindrical vortex chamber, a small flow pipe connected to a peripheral portion of the vortex chamber along a tangential direction thereto, a large flow pipe connected to the peripheral portion while forming a predetermined angle with the small flow pipe, and an outlet pipe connected to an outlet formed at a central part of the vortex chamber. Here, the accumulator is characterized in that a first junction of the large flow pipe and the vortex chamber of the flow damper is located outside an extension line of an inner surface, at the side of the large flow pipe, of the small flow pipe.

Moreover, an accumulator according to a second aspect of the present invention, in the case of the accumulator of the first aspect, is characterized in that: a straight line is drawn from the first junction in a free-jet-spread proportion relative to the extension line of the inner surface, at the side of the large flow pipe, of the small flow pipe, the extension line drawn from a second junction of the large flow pipe and the small flow pipe; a first intersecting point of the straight line and an inner surface, at the opposite side of the small flow pipe, of the large flow pipe is obtained; a tangent is drawn from the first intersecting point to an inner peripheral surface of the vortex chamber to obtain a second intersecting point of the tangent and the inner peripheral surface of the vortex chamber; a flat surface portion including a line linking the first intersecting point with the second intersecting point is used as an extended surface portion of the inner peripheral surface of the vortex chamber; and a junction of the extended surface portion and the inner surface, at the opposite side of the small flow pipe, of the large flow pipe is the first junction of the large flow pipe and the vortex chamber.

Furthermore, a method of manufacturing a flow damper according to a third aspect of the present invention is a method of manufacturing a flow damper including a cylindrical vortex chamber, a small flow pipe connected to a peripheral portion of the vortex chamber along a tangential direction thereto, a large flow pipe connected to the peripheral portion while forming a predetermined angle with the small flow pipe, and an outlet pipe connected to an outlet formed at a central part of the vortex chamber, the method characterized by including the steps of: drawing an extension line of an inner surface, at the side of the large flow pipe, of the small flow pipe from a second junction of the large flow pipe and the small flow pipe; drawing a straight line from a first junction in a free-jet-spread proportion relative to the extension line; obtaining a first intersecting point of the straight line and an inner surface, at the opposite side of the small flow pipe, of the large flow pipe; drawing a tangent from the first intersecting point to an inner peripheral surface of the vortex chamber to obtain a second intersecting point of the tangent and the inner peripheral surface of the vortex chamber; using a flat surface portion including a line linking the first intersecting point with the second intersecting point as an extended surface portion of the inner peripheral surface of the vortex chamber; and using a junction of the extended surface portion and the inner surface, at the opposite side of the small flow pipe, of the large flow pipe as the first junction of the large flow pipe and the vortex chamber.

The accumulator of the first aspect of the present invention is characterized in that the first junction of the large flow pipe and the vortex chamber of the flow damper is located outside the extension line of the inner surface, at the side of the large flow pipe, of the small flow pipe. Accordingly, a spreading portion of a free jet from the small flow pipe flows along the inner peripheral surface of the vortex chamber at the time of a small flow injection without being detached from the inner peripheral surface of the vortex chamber. Hence it is possible to form a strong vortex in the vortex chamber and to obtain a high flow resistance.

In particular, the accumulator of the second aspect of the present invention is characterized in that: a straight line is drawn from the first junction in a free-jet-spread proportion relative to the extension line of the inner surface, at the side of the large flow pipe, of the small flow pipe, the extension line drawn from a second junction of the large flow pipe and the small flow pipe; a first intersecting point of the straight line and an inner surface, at the opposite side of the small flow pipe, of the large flow pipe is obtained; a tangent is drawn from the first intersecting point to an inner peripheral surface of the vortex chamber to obtain a second intersecting point of the tangent and the inner peripheral surface of the vortex chamber; a flat surface portion including a line linking the first intersecting point with the second intersecting point is used as an extended surface portion of the inner peripheral surface of the vortex chamber; and a junction of the extended surface portion and the inner surface, at the opposite side of the small flow pipe, of the large flow pipe is the first junction of the large flow pipe and the vortex chamber. Hence it is possible to form a strong vortex in the vortex chamber, and to obtain a high flow resistance.

Similarly, the method of manufacturing a flow damper of the third aspect of the present invention is characterized in that: a straight line is drawn from the first junction in a free-jet-spread proportion relative to the extension line of the inner surface, at the side of the large flow pipe, of the small flow pipe, the extension line drawn from a second junction of the large flow pipe and the small flow pipe; a first intersecting point of the straight line and an inner surface, at the opposite side of the small flow pipe, of the large flow pipe is obtained; a tangent is drawn from the first intersecting point to an inner peripheral surface of the vortex chamber to obtain a second intersecting point of the tangent and the inner peripheral surface of the vortex chamber; a flat surface portion including a line linking the first intersecting point with the second intersecting point is used as an extended surface portion of the inner peripheral surface of the vortex chamber; and a junction of the extended surface portion and the inner surface, at the opposite side of the small flow pipe, of the large flow pipe is the first junction of the large flow pipe and the vortex chamber. Accordingly, the spreading portion of the free jet from the small flow pipe flows more securely along the inner peripheral surface (the extended surface portion) of the vortex chamber at the time of a small flow injection without being detached from the inner peripheral surface (the extended surface portion) of the vortex chamber. Hence it is possible to form a strong vortex in the vortex chamber, and to obtain a high flow resistance.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE PREFERRED EMBODIMENT

Hereinafter, a preferred embodiment of the present invention will be described below in detail with reference to the accompanying drawings.

(Configuration)

Figure 1:
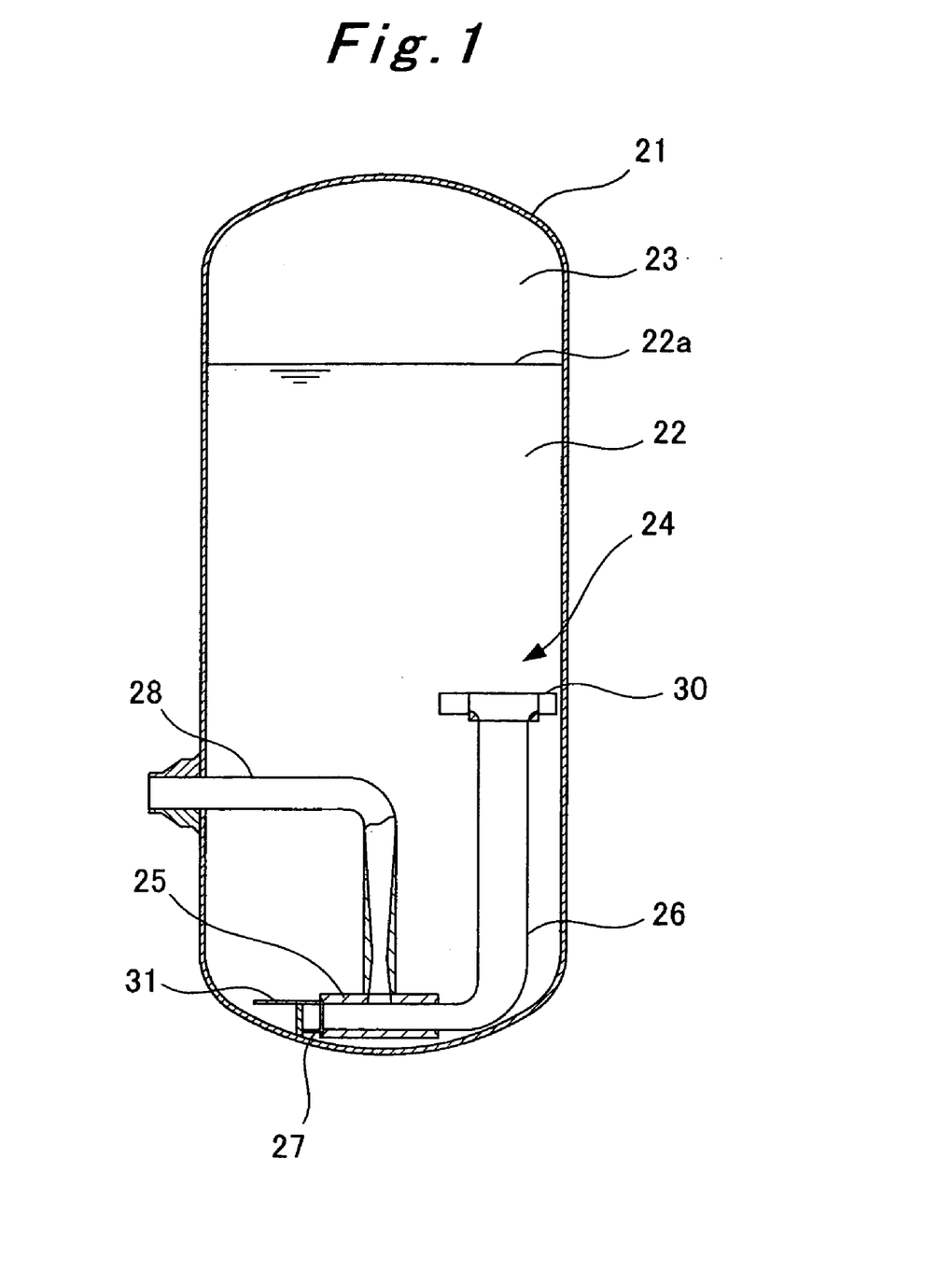
FIG. 1 is a cross-sectional view of an accumulator according to an embodiment of the present invention.
Figure 2:
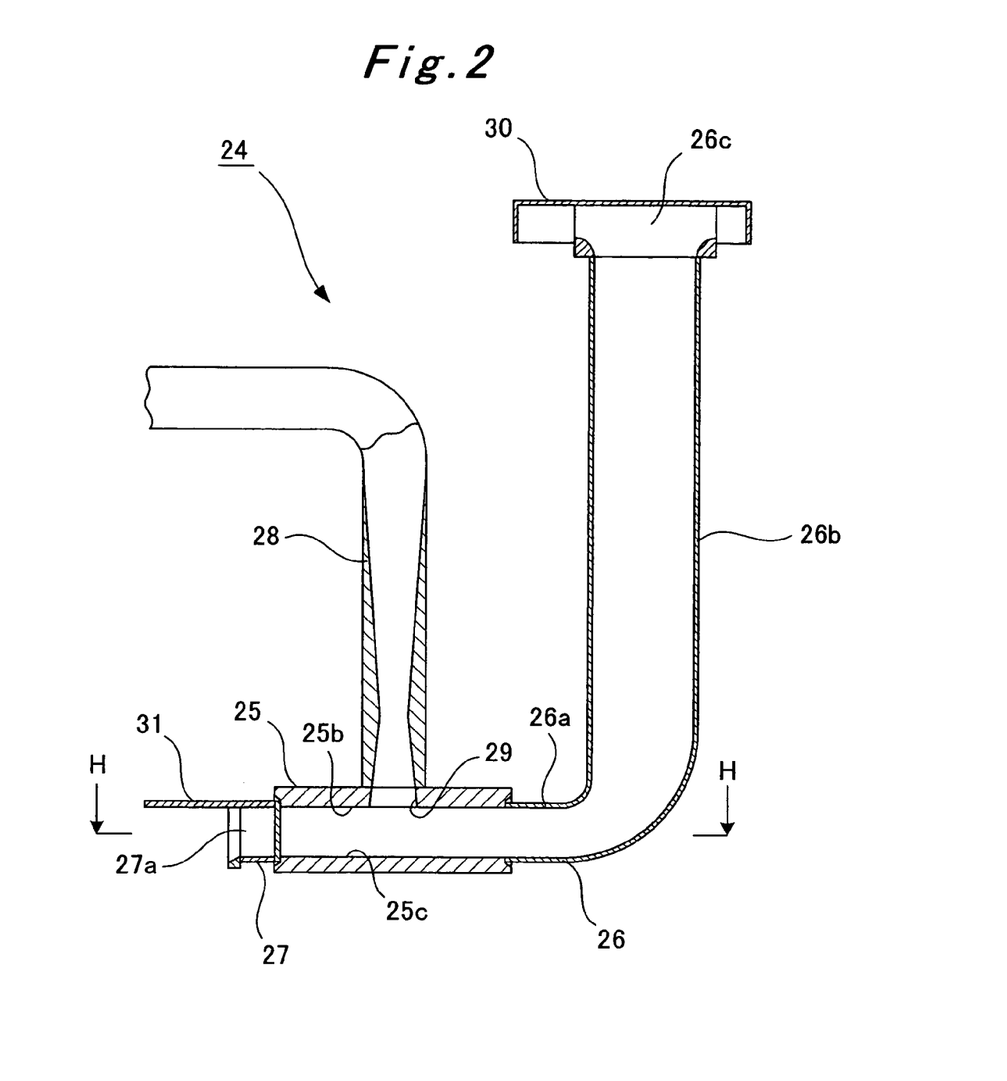
FIG. 2 is an enlarged cross-sectional view extracting and showing a flow damper included in the accumulator.

An accumulator 21 shown in FIG. 1 is an apparatus constituting part of an emergency core cooling system, which is installed in a pressurized water reactor (PWR) power plant on the assumption that a loss of primary coolant accident might occur in the PWR power plant.

As shown in FIG. 1, water (a coolant) 22 is stored in the accumulator 21, and the water 22 stored therein is pressurized by a pressurizing gas (nitrogen gas) 23 which is filled in an upper part in the accumulator 21. Moreover, a flow damper 24, which can switch a water injection flow rate in a reactor from a large flow to a small flow statically, is provided in the accumulator 21.

The flow damper 24 includes a vortex chamber 25, a large flow pipe 26, a small flow pipe 27, an outlet pipe 28 and the like, and is disposed at the bottom in the accumulator 21. Although illustration is omitted, a tip end of the outlet pipe 28 is connected to a low temperature pipeline of a reactor primary coolant loop with a check valve interposed in between. The check valve is used for avoiding a back flow from a rector primary cooling system to the accumulator 21.

As shown in FIG. 1 to FIG. 5B, the flow damper 24 has a structure in which the large flow pipe 26 and the small flow pipe 27 are connected to a peripheral portion (a. circumferential portion) of the cylindrical vortex chamber 25, while an outlet 29 is formed in the center of an upper surface 25b of the vortex chamber 25. Alternatively, the outlet 29 may be provided in the center of a lower surface 25c of the vortex chamber 25.

Figure 3:
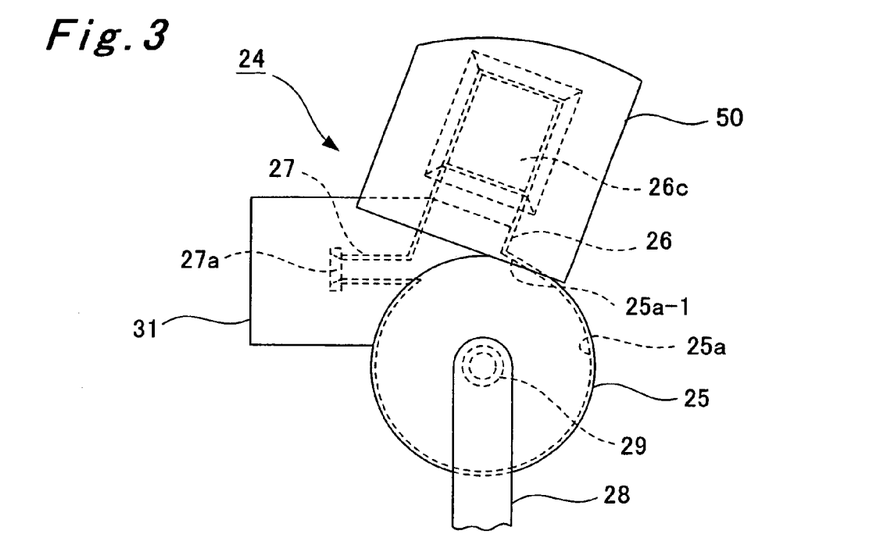
FIG. 3 is a plan view of the flow damper.
Figure 4:
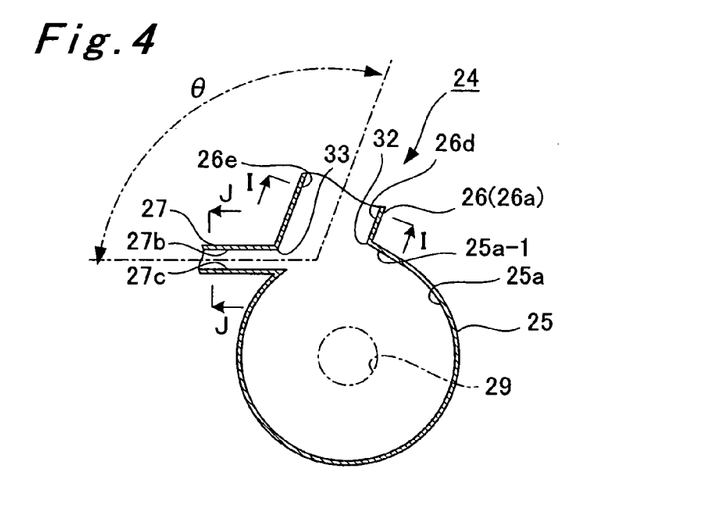
FIG. 4 is a cross-sectional view taken along, and indicated by, the H-H arrow line in FIG. 2.

In view of horizontal surfaces as illustrated in FIG. 3 and FIG. 4, the large flow pipe 26 and the small flow pipe 27 extend in mutually different directions from the outlet 29. Specifically, the small flow pipe 27 extends in a direction (which is the left direction in the drawings) along a tangential direction to the peripheral portion (the circumferential portion) of the vortex chamber 25. Meanwhile, the large flow pipe 26 extends in another direction (which is the right direction in the drawings) while forming a predetermined angle θ (in a range from 90°<θ<180°; such as 95°, 100° or 110°) with the small flow pipe 27.

Figure 5A:
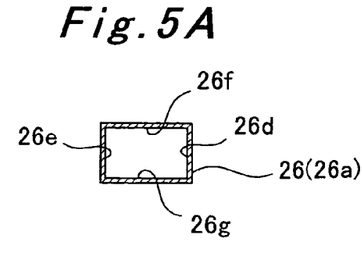
FIG. 5A is a cross-sectional view taken along, and indicated by, the I-I line in FIG. 4.
Figure 5B:
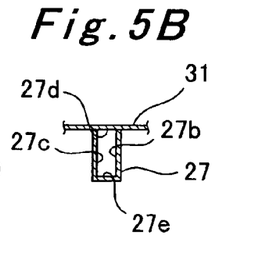
FIG. 5B is a cross-sectional view taken along, and indicated by, the J-J line in FIG. 4.

Cross sections of flow passages of the large flow pipe 26 and the small flow pipe 27 are formed into rectangular shapes. Specifically, as shown in FIGS. 5A and 5b, for example, the large flow pipe 26 (a horizontal portion 26a) has a parallel pair of inner surfaces (vertical surfaces) 26d and 26e which face each other in the horizontal direction, and a parallel pair of inner surfaces (horizontal surfaces) 26f and 26g which face each other in the vertical direction. Meanwhile, the small flow pipe 27 has a parallel pair of inner surfaces (vertical surfaces) 27b and 27c which face each other in the horizontal direction, and a parallel pair of inner surfaces (horizontal surfaces) 27d and 27e which face each other in the vertical direction. The heights of the flow-passage cross sections of the large flow pipe 26 and the small flow pipe 27 (the heights of the inner surfaces 26d and 26e and of the inner surfaces 27b and 27c) are the same as the height of an inner peripheral surface 25a of the vortex chamber 25. On the other hand, the widths of the flow-passage cross sections of the large flow pipe 26 (the widths of the inner surfaces 26f and 26g) are greater than the widths of the flow-passage cross sections of the small flow pipe 27 (the widths of the inner surfaces 27d and 27e).

Moreover, an inlet 27a of the small flow pipe 27 is located at the same height as that of the inner peripheral surface 25a of the vortex chamber 25. On the other hand, the large flow pipe 26 includes a standpipe 26b connected to the horizontal portion 26a, and an inlet 26c thereof is located higher than the vortex chamber 25 and the inlet 27a of the small flow pipe 27. It is to be noted, however, that a water level 22a of the stored water 22 is usually located higher than this inlet 26c of the large flow pipe 26. The outlet pipe 28 is connected to the outlet 29 of the vortex chamber 25. Anti-vortex plates 30 and 31 are respectively provided to the inlets 26c and 27a of the large flow pipe 26 and the small flow pipe 27.

Figure 6:
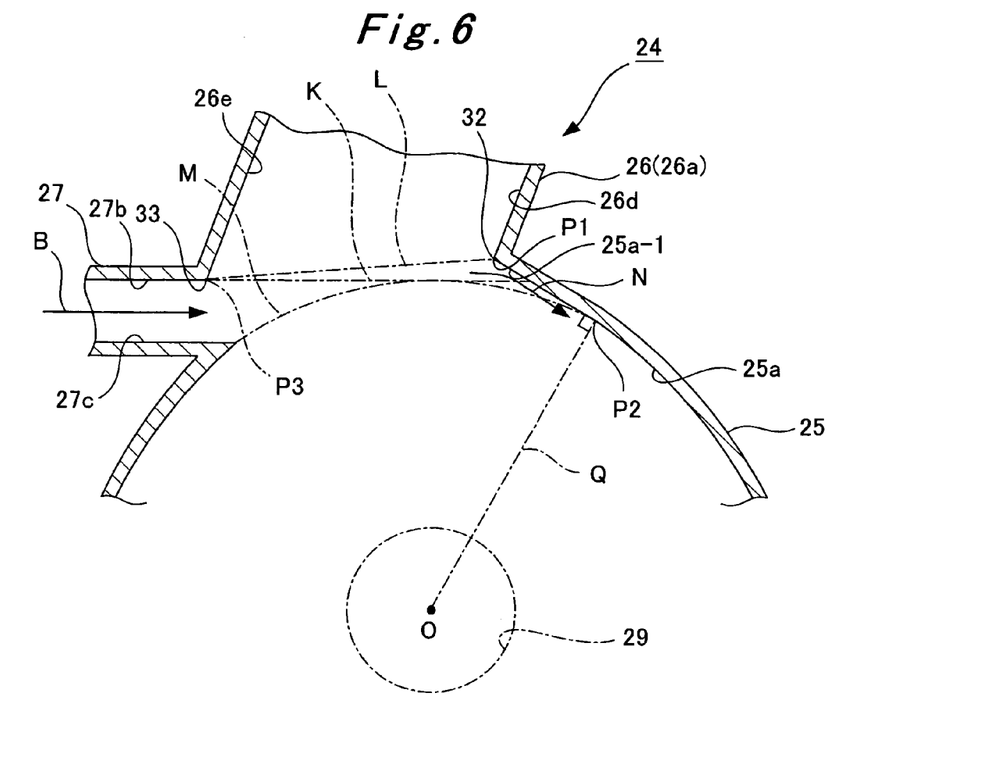
FIG. 6 is an enlarged cross-sectional view of a substantial part in FIG. 4.

Moreover, as shown in FIG. 6, the flow damper 24 of this embodiment has a structure of a wall facing the small flow pipe, in which a junction 32 of the large flow pipe 26 (the inner surface 26d located opposite to the small flow pipe 27) and the vortex chamber 25 (an extended surface portion 25a-1, at the opposite side of the small flow pipe 27, of the inner peripheral surface 25a) is located outside (upward in FIG. 6) an extension line (a virtual line) K of the inner surface 27b, at the side of the large flow pipe 26, of the small flow pipe 27.

Describing in detail, in FIG. 6, the virtual line K is the extension line of the inner surface 27b of the small flow pipe 27, i.e., a straight line extending from a junction 33 (an intersecting point P3 which is a point at the junction 33) of the inner surface 27b of the small flow pipe 27 and the inner surface 26e, at the side of the small flow pipe 27, of the large flow pipe 26 along an axial direction (i.e., the tangential direction) of the small flow pipe 27. A virtual line L is a straight line representing a free-jet-spread of the water injected from the small flow pipe 27 into the vortex chamber 25. A free-jet-spread proportion (an inclination of the straight line L relative to the straight line K) is set at ⅒. Incidentally, as for the free-jet-spread proportion, the above-mentioned generally known value may be used, or a free-jet-spread proportion may be set up in accordance with an experiment as appropriate. A virtual line M is a curve (an arc) along the circular shape of the inner peripheral surface 25a of the vortex chamber 25.

Moreover, concrete design procedures (a method of manufacturing a flow damper) for obtaining the junction 32 of inner surface 26d of the large flow pipe 26 and the inner peripheral surface 25a of the vortex chamber 25 (i.e. an intersecting point P1 at the junction 32) are as follows.

First, the straight line L is drawn from the junction 33 (the intersecting point P3) in the free-jet-spread proportion relative to the extension line K drawn from the junction 33 (the intersecting point P3), and the intersecting point P1 of this straight line L and the inner surface 26d of the large flow pipe 26 is obtained. Subsequently, a tangent (not shown) is drawn from this intersecting point P1 toward the inner peripheral surface 25a of the vortex chamber 25, and an intersecting point P2 of this tangent and the inner peripheral surface 25a is obtained. Thereafter, the flat surface portion 25a-1 including a line which links the intersecting point P1 with the intersecting point P2 (i.e. the tangent) is used as the extended surface portion of the inner peripheral surface 25a (here, a line linking the center O of the vortex chamber 25 with the intersecting point P2 and the flat surface portion (the extended surface portion) 25a-1 form a right angle). In this way, the inner surface 26d of the large flow pipe 26 is connected to the flat surface portion (the extended surface portion) 25a-1 of the inner peripheral surface 25a of the vortex chamber 25. Here, this junction 32 (the intersecting point P1) is located (on the straight line L) outside the extension line K.

(Operation and Effects)

The accumulator 21 having the above-described configuration exerts the following operation and effects.

If a pipeline or the like in a reactor primary cooling system of a PWR power plant is broken, and the coolant flows out of a crack to the outside (i.e. upon occurrence of a loss of primary coolant accident), thereby reducing a pressure of the primary cooling system below a pressure in the accumulator 21, the stored water 22 in the accumulator 21 is injected from the primary cooling system pipeline into a reactor vessel through a check valve, and thereby refloods a reactor core. At this time, the water injection flow rate to the reactor vessel is switched from a large flow to a small flow statically by way of the flow damper 24.

Figure 7A:
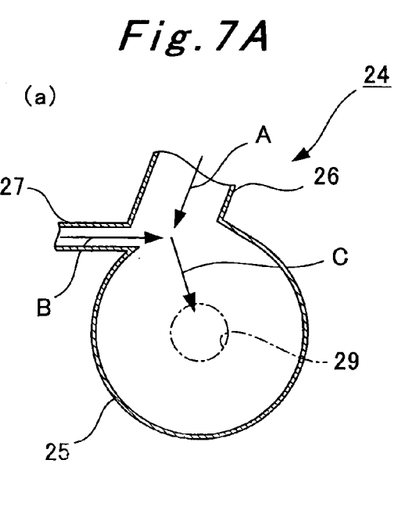
FIGS. 7A and 7B are views for explaining water injection flow switching by use of the flow damper.

Specifically, since the water level in the accumulator 21 is higher than the inlet 26c of the large flow pipe 26 at an initial stage of water injection, the water 22 in the accumulator 21 flows into the vortex chamber 25 from both of the large flow pipe 26 and the small flow pipe 27 as indicated with arrows A and B in FIG. 7A. As a result, the injected water (a jet) from the large flow pipe 26 collides with the injected water (a jet) from the small flow pipe 27, and angular momenta of the jets are offset. In this way, the water 22 flows directly toward the outlet 29 as indicated with an arrow C in FIG. 7A. Specifically, no vortex is formed in the vortex chamber 25 at this time. Accordingly, a flow resistance is reduced at this time, and a large amount of water flows out of the outlet 29 and is injected into the reactor vessel.

Figure 7B:
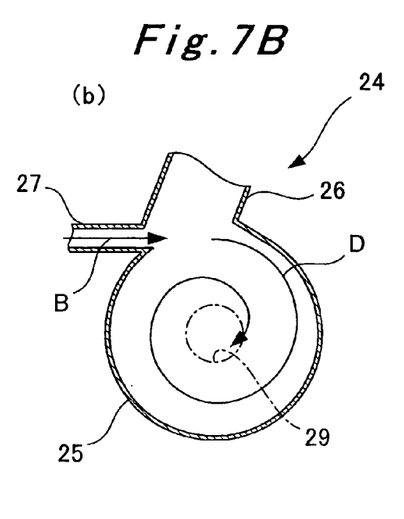

By contrast, at a later stage of water injection, the water level in the accumulator 21 drops below the inlet 26c of the standpipe connected to the large flow pipe 26. Accordingly, there is no water 22 flowing from the large flow pipe 26 into the vortex chamber 25, and the water 22 flows into the vortex chamber 25 only through the small flow pipe 27 as indicated with an arrow B in FIG. 7B. As a result, the injected water from this small flow pipe 27 proceeds to the outlet 29 while forming a vortex (a swirling flow) as indicated with an arrow D in FIG. 7B. Accordingly, the flow resistance is increased by the centrifugal force at this time, and an outflow (the water injected to the reactor vessel) from the outlet 29 becomes a small flow.

Moreover, the accumulator 21 of this embodiment is characterized in that the junction 32 of the large flow pipe 26 (the inner surface 26d) and the vortex chamber 25 (the extended surface portion 25a-1 of the inner surface 25a) of the flow damper 24 is located outside the extension line of the inner surface 27b, at the side of the large flow pipe 26, of the small flow pipe 27. Accordingly, the free-jet-spreading portion from the small flow pipe 27 flows along the inner peripheral surface 25a of the vortex chamber 25 at the time of a small flow injection without being detached from the inner peripheral surface 25a of the vortex chamber 25. Hence it is possible to form a strong vortex in the vortex chamber 25, and to obtain a high flow resistance.

In particular, the flow damper 24 of this accumulator 21 is characterized in that: the straight line L is drawn from the junction 33 (the third intersecting point P3) in the free-jet-spread proportion relative to the extension line K of the inner surface 27b, at the side of the large flow pipe 26, of the small flow pipe 27 drawn from the junction 33 (the third intersecting point P3) of the small flow pipe 27 and the large flow pipe 26; the first intersecting point P1 of this straight line L and the inner surface 26d, at the opposite side of the small flow pipe 27, of the large flow pipe 26 is obtained; the tangent is drawn from this first intersecting point P1 to the inner peripheral surface 25a of the vortex chamber 25 to obtain the second intersecting point P2 of the tangent and the inner peripheral surface 25a of the vortex chamber 25; the flat surface portion 25a-1 including the line (the tangent) linking the first intersecting point P1 with the second intersecting point P2 is used as the extended surface portion of the inner peripheral surface 25a of the vortex chamber 25; and the junction of this extended surface portion 25a-1 and the inner surface 26d, at the opposite side of the small flow pipe 27, of the large flow pipe 26 is the junction 32 of the large flow pipe 26 and the vortex chamber 25. As a result, the free-jet-spreading portion from the small flow pipe 27 flows more securely along the inner peripheral surface 25a (the extended surface portion 25a-1) of the vortex chamber 25 at the time of a small flow injection without being detached from the inner peripheral surface 25a (the extended surface portion 25a-1) of the vortex chamber 25, as indicated with an arrow N in FIG. 6. Hence it is possible to form a strong vortex in the vortex chamber 25, and to obtain a high flow resistance.

The invention thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. An accumulator provided with a flow damper inside, the flow damper including a cylindrical vortex chamber, a small flow pipe connected to a peripheral portion of the vortex chamber along a tangential direction thereto, a large flow pipe connected to the peripheral portion while forming a predetermined angle with the small flow pipe, and an outlet pipe connected to an outlet formed at a central part of the vortex chamber, wherein a first junction formed at the intersection of the large flow pipe at an inner surface, which is located opposite to the small flow pipe, and the vortex chamber, which has an extended surface portion as a part of an inner peripheral surface, and is situated at the opposite side of the small flow pipe, is located outside an extension line of an inner surface of the small flow pipe, the extension line drawn along the tangential direction from a second junction formed at the intersection of the large flow pipe and the small flow pipe.

2. The accumulator according to claim 1, wherein a straight line is drawn from the second junction in a free-jet-spread proportion relative to the extension line of the inner surface of the small flow pipe, a first intersecting point of the straight line and the inner surface of the large flow pipe, at the first junction, is obtained, a line is drawn from the first intersecting point to the inner peripheral surface of the vortex chamber to obtain a second intersecting point of the line and the inner peripheral surface of the vortex chamber, a flat surface portion that includes the line linking the first intersecting point with the second intersecting point is used as the extended surface portion of the inner peripheral surface of the vortex chamber, and a junction of the extended surface portion and the inner surface of the large flow pipe, said inner surface of the large flow pipe being at the opposite side of the small flow pipe, is the first junction of the large flow pipe and the vortex chamber.

3. A method of setting a position of a junction of a large flow pipe and a vortex chamber in a flow damper including a cylindrical vortex chamber, a small flow pipe connected to a peripheral portion of the vortex chamber along a tangential direction thereto, a large flow pipe connected to the peripheral portion while forming a predetermined angle with the small flow pipe, and an outlet pipe connected to an outlet formed at a central part of the vortex chamber, the method comprising the steps of:

drawing an extension line of an inner surface of the small flow pipe along the tangential direction from a second junction of the large flow pipe and the small flow pipe;

drawing a straight line from the second junction in a free-jet-spread proportion relative to the extension line;

obtaining a first intersecting point of the straight line and the inner surface of the large flow pipe, said inner surface being at the opposite side of the small flow pipe;

drawing a line from the first intersecting point to the inner peripheral surface of the vortex chamber to obtain a second intersecting point of the tangent and the inner peripheral surface of the vortex chamber;

using a flat surface portion that includes the line linking the first intersecting point with the second intersecting point as an extended surface portion of the inner peripheral surface of the vortex chamber; and using a junction of the extended surface portion and the inner surface of the large flow pipe as a first junction of the large flow pipe and the vortex chamber, wherein said inner surface of the large flow pipe being at the opposite side of the small flow pipe.

* * * * *